(12) United States Patent
Shen et al.

(10) Patent No.: US 12,684,426 B2
(45) Date of Patent: Jul. 14, 2026

(54) SILENT REDIAL FOR VIDEO TELEPHONY CALLS

(71) Applicant: QUALCOMM Incorporated, San Diego, CA (US)

(72) Inventors: Xinning Shen, San Diego, CA (US); Qin Xue Frantti, San Diego, CA (US); Osama Lotfallah, San Diego, CA (US); Flora Pui San Chan, San Diego, CA (US); Xiaomeng Lu, Shanghai (CN)

(73) Assignee: Qualcomm Incorporated, San Diego, CA (US)

( * ) Notice: Subject to any disclaimer, the term of this patent is extended or adjusted under 35 U.S.C. 154(b) by 241 days.

(21) Appl. No.: 18/557,263

(22) PCT Filed: Jul. 2, 2021

(86) PCT No.: PCT/CN2021/104154
§ 371 (c)(1),
(2) Date: Oct. 25, 2023

(87) PCT Pub. No.: WO2023/272707
PCT Pub. Date: Jan. 5, 2023

(65) Prior Publication Data
US 2024/0214878 A1 Jun. 27, 2024

(51) Int. Cl.
*H04W 36/00* (2009.01)
*H04M 11/08* (2006.01)

(52) U.S. Cl.
CPC ... *H04W 36/00224* (2023.05); *H04M 11/085* (2013.01); *H04W 36/00226* (2023.05)

(58) Field of Classification Search
CPC ..... H04W 36/00224; H04W 36/00226; H04M 11/085
See application file for complete search history.

(56) References Cited

U.S. PATENT DOCUMENTS 5,987,018 A * 11/1999 Freeburg ............... H04L 1/1854
370/522
7,145,898 B1 * 12/2006 Elliott ................... H04L 65/103
379/900
(Continued)

FOREIGN PATENT DOCUMENTS

CN 1835630 A 9/2006
CN 105324977 2/2016
(Continued)

OTHER PUBLICATIONS

International Search Report and Written Opinion—PCT/CN2021/104154—ISA/EPO—Apr. 7, 2022.
(Continued)

*Primary Examiner* — David Bilodeau
(74) *Attorney, Agent, or Firm* — Holland & Hart LLP

(57) ABSTRACT

Methods, systems, and devices for wireless communications are described. A user equipment (UE) may use the techniques described herein to reattempt a video telephony (VT) call after receiving a rejection message indicating that a prior attempt at the VT call failed. In some cases, the UE may have a first configuration indicating that the UE is to redial VT calls exclusively using packet-switched (PS) networks. In other cases, the UE may have a second configuration indicating that the UE is to switch to a circuit-switched (CS) network after one or more failed attempts at the VT call using PS networks. In any case, once the UE receives a rejection message in response to a prior attempt at a VT call, the UE may reattempt the VT call based on a rejection cause in the rejection message and whether the UE has the first configuration or the second configuration.

30 Claims, 8 Drawing Sheets

(56) References Cited

U.S. PATENT DOCUMENTS

| | | | | |
|---|---|---|---|---|
| 7,995,562 | B2 | 8/2011 | Purnadi et al. | |
| 9,584,553 | B2 | 2/2017 | Swaminathan et al. | |
| 10,492,243 | B2 | 11/2019 | Chiang et al. | |
| 2005/0239444 | A1* | 10/2005 | Shieh | H04N 21/631 |
| | | | | 455/418 |
| 2008/0069070 | A1* | 3/2008 | Sayeedi | H04W 36/0066 |
| | | | | 370/342 |
| 2008/0205413 | A1* | 8/2008 | Purnadi | H04W 36/00224 |
| | | | | 709/228 |
| 2012/0170503 | A1* | 7/2012 | Kelley | H04W 48/06 |
| | | | | 370/312 |
| 2013/0023265 | A1 | 1/2013 | Swaminathan et al. | |
| 2015/0003342 | A1* | 1/2015 | Swaminathan | H04W 76/18 |
| | | | | 370/329 |
| 2016/0044545 | A1* | 2/2016 | Yang | H04W 36/00224 |
| | | | | 370/331 |
| 2016/0330655 | A1 | 11/2016 | Vashi et al. | |
| 2018/0063754 | A1 | 3/2018 | Wang et al. | |
| 2019/0281506 | A1* | 9/2019 | Chiang | H04L 65/1069 |
| 2019/0281647 | A1* | 9/2019 | Chiang | H04L 65/1069 |
| 2021/0377817 | A1* | 12/2021 | Lu | H04W 36/305 |
| 2022/0286919 | A1* | 9/2022 | Chisu | H04W 4/029 |
| 2022/0287129 | A1* | 9/2022 | Chisu | H04W 4/029 |

FOREIGN PATENT DOCUMENTS

| | | |
|---|---|---|
| CN | 105722158 A | 6/2016 |
| CN | 106105314 A | 11/2016 |
| WO | WO-2006097045 | 9/2006 |
| WO | WO-2014210253 | 12/2014 |

OTHER PUBLICATIONS

Supplementary European Search Report—EP21947658—Search Authority—The Hague—Feb. 18, 2025.

* cited by examiner

205

210

105-a 110-a

Switch

230

220

215

115-a 110-b 105-b

225

Rejection Message

200

Receiver

Communications Manager

Transmitter

410

420

415

405

400

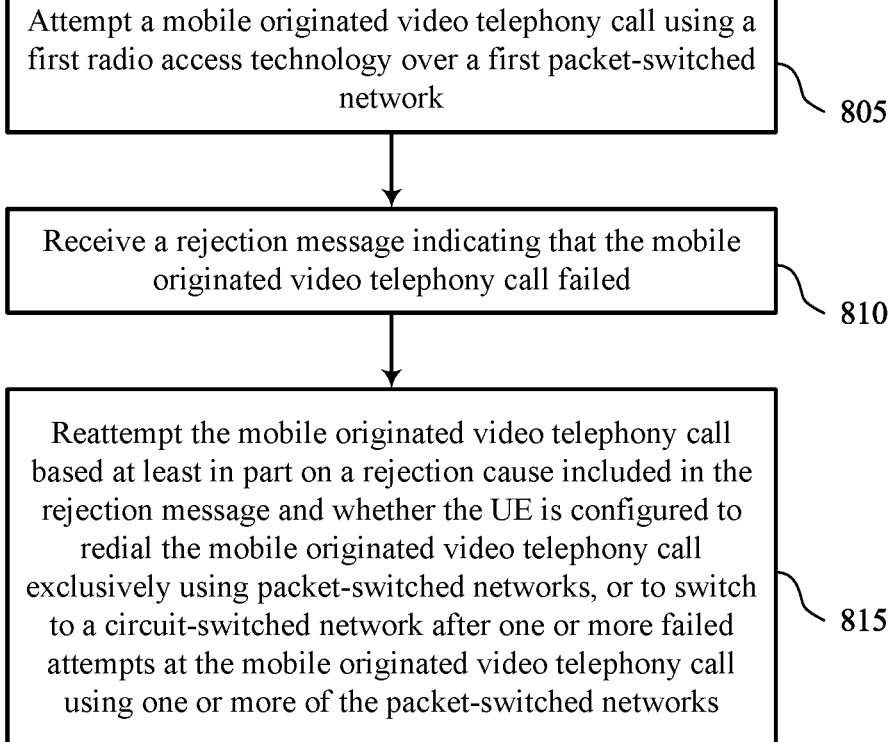

Attempt a mobile originated video telephony call using a first radio access technology over a first packet-switched network

805

Receive a rejection message indicating that the mobile originated video telephony call failed

810

Reattempt the mobile originated video telephony call based at least in part on a rejection cause included in the rejection message and whether the UE is configured to redial the mobile originated video telephony call exclusively using packet-switched networks, or to switch to a circuit-switched network after one or more failed attempts at the mobile originated video telephony call using one or more of the packet-switched networks

SILENT REDIAL FOR VIDEO TELEPHONY CALLS

CROSS REFERENCE

The present Application is a 371 national stage filing of International PCT Application No. PCT/CN2021/104154 by SHEN et al. entitled "SILENT REDIAL FOR VIDEO TELEPHONY CALLS," filed Jul. 2, 2021, which is assigned to the assignee hereof, and which is expressly incorporated by reference in its entirety herein.

FIELD OF TECHNOLOGY

The following relates to wireless communications, including silent redial for video telephony calls.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support video telephony (VT) calls, however challenges may be present in supporting VT calls over wireless connections.

SUMMARY

The described techniques relate to improved methods, systems, devices, and apparatuses that support silent redial for video telephony (VT) calls. A user equipment (UE) may use the techniques described herein to reattempt or redial a VT call after receiving a rejection message indicating that a prior attempt at the VT call failed. In some cases, the UE may have a first configuration indicating that the UE is to redial VT calls exclusively using packet-switched (PS) networks. In other cases, the UE may have a second configuration indicating that the UE is to switch or fallback to a circuit-switched (CS) network after one or more failed attempts at the VT call using PS networks. In any case, once the UE receives a rejection message in response to a prior attempt at a VT call, the UE may reattempt the VT call based on a rejection cause included in the rejection message and whether the UE has the first configuration or the second configuration. Using these techniques, the UE may be able to efficiently reattempt VT calls resulting in an increased success rate for VT calls and improved user experience.

A method for wireless communication at a UE is described. The method may include attempting a mobile originated video telephony call using a first radio access technology over a first packet-switched network, receiving a rejection message indicating that the mobile originated video telephony call failed, and reattempting the mobile originated video telephony call based on a rejection cause included in the rejection message and whether the UE is configured to redial the mobile originated video telephony call exclusively using packet-switched networks, or to switch to a circuit-switched network after one or more failed attempts at the mobile originated video telephony call using one or more of the packet-switched networks.

An apparatus for wireless communication at a UE is described. The apparatus may include a processor, memory coupled with the processor, and instructions stored in the memory. The instructions may be executable by the processor to cause the apparatus to attempt a mobile originated video telephony call using a first radio access technology over a first packet-switched network, receive a rejection message indicating that the mobile originated video telephony call failed, and reattempt the mobile originated video telephony call based on a rejection cause included in the rejection message and whether the UE is configured to redial the mobile originated video telephony call exclusively using packet-switched networks, or to switch to a circuit-switched network after one or more failed attempts at the mobile originated video telephony call using one or more of the packet-switched networks.

Another apparatus for wireless communication at a UE is described. The apparatus may include means for attempting a mobile originated video telephony call using a first radio access technology over a first packet-switched network, means for receiving a rejection message indicating that the mobile originated video telephony call failed, and means for reattempting the mobile originated video telephony call based on a rejection cause included in the rejection message and whether the UE is configured to redial the mobile originated video telephony call exclusively using packet-switched networks, or to switch to a circuit-switched network after one or more failed attempts at the mobile originated video telephony call using one or more of the packet-switched networks.

A non-transitory computer-readable medium storing code for wireless communication at a UE is described. The code may include instructions executable by a processor to attempt a mobile originated video telephony call using a first radio access technology over a first packet-switched network, receive a rejection message indicating that the mobile originated video telephony call failed, and reattempt the mobile originated video telephony call based on a rejection cause included in the rejection message and whether the UE is configured to redial the mobile originated video telephony call exclusively using packet-switched networks, or to switch to a circuit-switched network after one or more failed attempts at the mobile originated video telephony call using one or more of the packet-switched networks.

In some examples of the method, apparatuses, and non-transitory computer-readable medium described herein, reattempting the mobile originated video telephony call may include operations, features, means, or instructions for reattempting the mobile originated video telephony call using a second radio access technology over a second packet-switched network. Some examples of the method, apparatuses, and non-transitory computer-readable medium described herein may further include operations, features, means, or instructions for reattempting the mobile originated video telephony call may be based on the rejection cause indicating a permanent rejection of the mobile originated video telephony call using the first radio access technology.

In some examples of the method, apparatuses, and non-transitory computer-readable medium described herein, the permanent rejection corresponds to a hard failure of the mobile originated video telephony call via the first radio access technology. In some examples of the method, apparatuses, and non-transitory computer-readable medium described herein, the rejection message indicates a network service rejection or an internet protocol multimedia subsystem permanent registration failure. In some examples of the method, apparatuses, and non-transitory computer-readable medium described herein, the rejection message may be due to a time to complete registration exceeding a threshold amount of time or the UE camping on a cell that lacks support for voice over internet protocol multimedia subsystem.

In some examples of the method, apparatuses, and non-transitory computer-readable medium described herein, reattempting the mobile originated video telephony call may include operations, features, means, or instructions for reattempting the mobile originated video telephony call using the first radio access technology over the first packet-switched network based on detecting that the UE previously attempted the mobile originated video telephony call using a second radio access technology. Some examples of the method, apparatuses, and non-transitory computer-readable medium described herein may further include operations, features, means, or instructions for reattempting the mobile originated video telephony call based on the rejection cause indicating a temporary rejection of the mobile originated video telephony call using the first radio access technology.

In some examples of the method, apparatuses, and non-transitory computer-readable medium described herein, the temporary rejection corresponds to a soft failure of the mobile originated video telephony call via the first radio access technology. In some examples of the method, apparatuses, and non-transitory computer-readable medium described herein, the rejection cause indicates a network service rejection, an internet protocol multimedia subsystem permanent registration failure, or an internet protocol multimedia subsystem temporary registration failure. Some examples of the method, apparatuses, and non-transitory computer-readable medium described herein may further include operations, features, means, or instructions for reattempting the mobile originated video telephony call includes reattempting the mobile originated video telephony call until a configurable timer expires.

Some examples of the method, apparatuses, and non-transitory computer-readable medium described herein may further include operations, features, means, or instructions for ending the mobile originated video telephony call. Some examples of the method, apparatuses, and non-transitory computer-readable medium described herein may further include operations, features, means, or instructions for ending the mobile originated video telephony call may be based on the rejection cause indicating a permanent rejection of the mobile originated video telephony call using the first radio access technology.

In some examples of the method, apparatuses, and non-transitory computer-readable medium described herein, the permanent rejection corresponds to a hard failure of the mobile originated video telephony call via the first radio access technology. Some examples of the method, apparatuses, and non-transitory computer-readable medium described herein may further include operations, features, means, or instructions for ending the mobile originated video may be further based on receiving another permanent rejection of the mobile originated video telephony call using a second radio access technology.

In some examples of the method, apparatuses, and non-transitory computer-readable medium described herein, the rejection cause indicates a network service rejection or a unified access control failure. In some examples of the method, apparatuses, and non-transitory computer-readable medium described herein, the rejection cause indicates that the mobile originated video telephony call failed due to network congestion, a service area restriction, or an invalid universal subscriber identity module.

Some examples of the method, apparatuses, and non-transitory computer-readable medium described herein may further include operations, features, means, or instructions for identifying a second public land mobile network through which to reattempt the mobile originated video telephony call based on failing to perform the mobile originated video telephony call through a first public land mobile network. In some examples of the method, apparatuses, and non-transitory computer-readable medium described herein, the rejection cause indicates an access barring related failure or a unified access control failure.

In some examples of the method, apparatuses, and non-transitory computer-readable medium described herein, the UE may be configured to redial the mobile originated video telephony call exclusively using packet-switched networks. Some examples of the method, apparatuses, and non-transitory computer-readable medium described herein may further include operations, features, means, or instructions for converting the mobile originated video telephony call to a voice call over the circuit-switched network after one or more failed attempts at the mobile originated video telephony call using one or more of the packet-switched networks.

BRIEF DESCRIPTION OF THE DRAWINGS

FIG. 8 shows a flowchart illustrating methods that support silent redial for VT calls in accordance with aspects of the present disclosure.

DETAILED DESCRIPTION

Some wireless communications systems may support video telephony (VT) calls between user equipment (UEs) via a base station (e.g., mobile originated (MO) VT calls). VT calls may differ from voice calls in that VT calls are facilitated by the transmission and reception of audio-video signals, whereas voice calls are facilitated by the transmission and reception of audio signals. If a voice call fails over a packet-switched (PS) network, a UE may reattempt or redial the voice call via a circuit-switched (CS) network. Examples of CS networks may include a Global System for Mobile Communications (GSM) network, a Code Division Multiple Access (CDMA) network, or a Wideband CDMA (W-CDMA) network. This reattempt or redial of the voice call or any call may be referred to as a silent redial. A silent redial may correspond to a UE redialing a call without user input or intervention (i.e., autonomously). However, because VT calls are facilitated by the transmission and reception of video signals, VT calls may not be performed via CS networks. Accordingly, a UE may not be able to use silent redial procedures designed for voice calls for VT calls. Instead, once a VT call fails, the UE may end the VT call without reattempting or redialing the VT call, resulting in degraded user experience.

As described herein, a wireless communications system may support efficient techniques to facilitate silent redialing for VT calls. A UE may use the techniques described herein to perform a silent redial for a VT call after receiving a rejection message indicating that a prior attempt at the VT call failed. In some cases, the UE may have a first configuration indicating that the UE is to perform silent redials for VT calls exclusively using PS networks. In other cases, the UE may have a second configuration indicating that the UE is to switch or fallback to a CS network after one or more failed attempts at the VT call using PS networks. In any case, once the UE receives a rejection message in response to a prior attempt at a VT call, the UE may perform a silent redial for the VT call based on a rejection cause included in the rejection message and whether the UE has the first configuration or the second configuration. Using these techniques, the UE may be able to efficiently support silent redialing for VT calls resulting in an increased success rate for VT calls and improved user experience.

Aspects of the disclosure are initially described in the context of wireless communications systems. Examples of processes and signaling exchanges that support silent redial for VT calls are then described. Aspects of the disclosure are further illustrated by and described with reference to apparatus diagrams, system diagrams, and flowcharts that relate to silent redial for VT calls.

Figure 1:
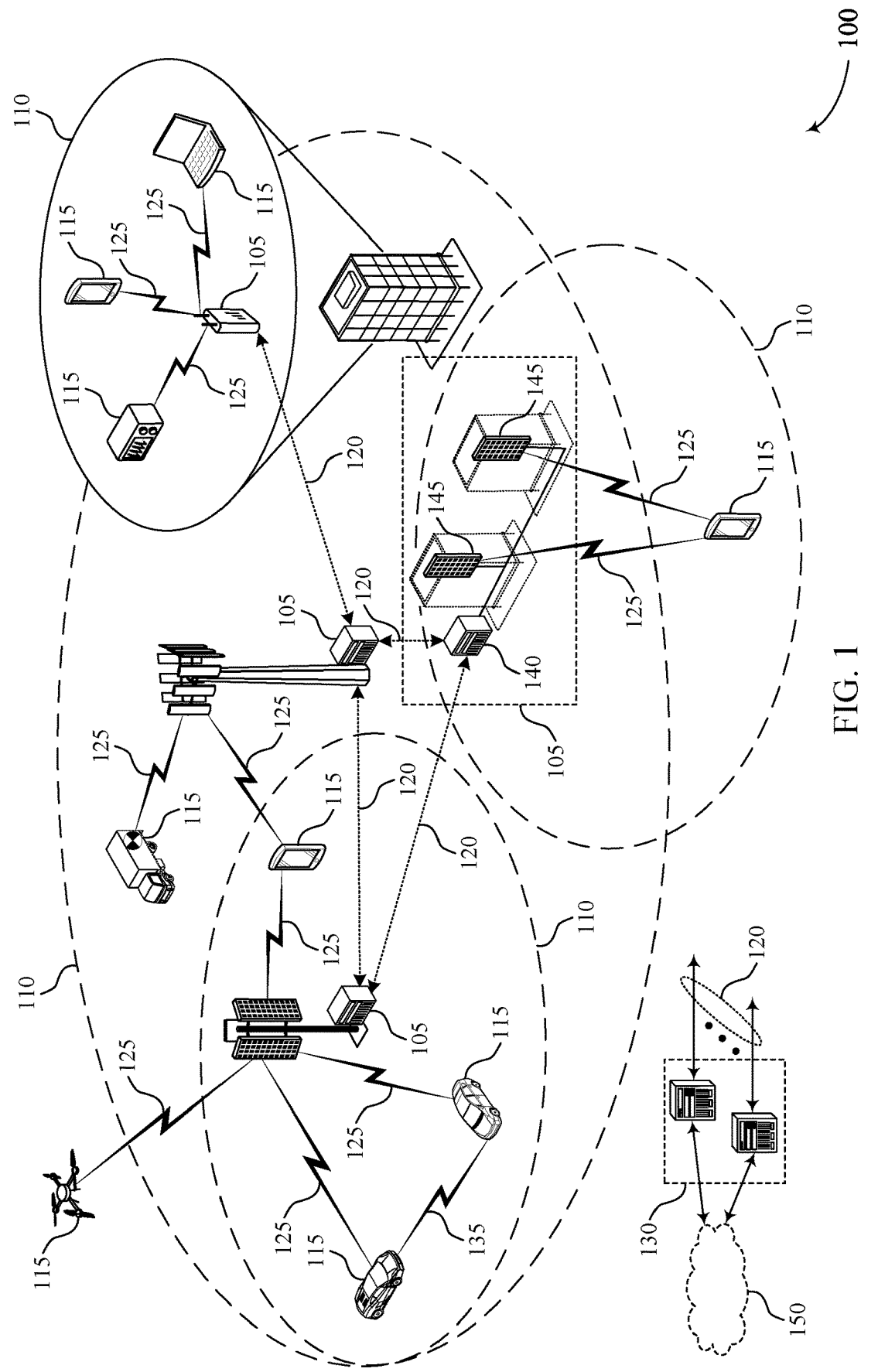
FIG. 1 illustrates an example of a wireless communications system that supports silent redial for video telephony (VT) calls in accordance with aspects of the present disclosure.

FIG. 1 illustrates an example of a wireless communications system 100 that supports silent redial for VT calls in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125.

The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications system 100 may support VT calls between UEs 115 via a base station 105. VT calls may differ from voice calls in that VT calls are facilitated by the transmission and reception of audio-video signals, whereas voice calls are facilitated by the transmission and reception of audio signals. If a voice call fails over a PS network, a UE may reattempt or redial the voice call via a CS network. This reattempt or redial of the voice call or any call may be referred to as a silent redial. A silent redial may correspond to a UE redialing a call without user input or intervention (e.g., autonomously). For over-the-air (OTA) failures (e.g., excluding IP multimedia subsystem (IMS) session initiation protocol (SIP) failures), a modem at a UE 115 may have a series of silent redial enhancements for MO voice calls. One example of an OTA failure may be receiving a rejection from a network in response to sending a service request.

In some aspects, however, because VT calls are facilitated by the transmission and reception of video signals, VT calls may not be performed via CS networks. Accordingly, a UE may not be able to follow silent redial procedures designed for voice calls for VT calls. Instead, once a VT call fails, the UE may end the VT call without reattempting or redialing the VT call. That is, in most cases, a modem at a UE 115 may end the VT call without trying to make the VT call via other cells or radio access technologies (RATs). In some cases, ending the VT call may not correspond to optimized behavior because the VT call may succeed over other cells or RATs. As a result, user experience may be degraded since VT calls that could have been successful were ended. As described herein, wireless communications system 100 may support efficient techniques for facilitating silent redialing for VT calls (e.g., to optimize silent redial behavior for MO VT calls when certain failures occur).

Figure 2:
FIG. 2 illustrates an example of a wireless communications system that supports silent redial for VT calls in accordance with aspects of the present disclosure.
Figure 2:

FIG. 2 illustrates an example of a wireless communications system 200 that supports silent redial for VT calls in accordance with aspects of the present disclosure. The wireless communications system 200 includes a UE 115-*a*, which may be an example of a UE 115 described with reference to FIG. 1. The wireless communications system 200 also includes a base station 105-*a* and a base station 105-*b*, which may be examples of a base station 105 described with reference to FIG. 1. The base station 105-*a* may provide communication coverage for UEs 115 in a coverage area 110-*a*, and the base station 105-*b* may provide communication coverage for UEs 115 in a coverage area 110-*b*.

The UE 115-*a* may communicate with the base station 105-*a* on resources of a carrier 205 and a carrier 210 (e.g., which may correspond to the same or different carriers). The UE 115-*a* may also communicate with the base station 105-*b* on resources of a carrier 215 and a carrier 220 (e.g., which may correspond to the same or different carriers). The wireless communications system 200 may implement aspects of the wireless communications system 100. For example, the wireless communications system 200 may support efficient techniques for facilitating silent redialing for VT calls.

In the example of FIG. 2, the UE 115-*a* may attempt a VT call over carrier 210 using a first RAT via the base station 105-*a*. The base station 105-*a* may support communications using the first RAT and may be an example of a first PS network. The UE 115-*a* may then receive a rejection message 225 from the base station 105-*a* indicating that the VT call failed. In accordance with the techniques described herein, the UE 115-*a* may then reattempt the VT call based on a rejection cause included in the rejection message and whether the UE is configured to redial the VT call exclusively using PS networks (e.g., a first configuration) or to switch to a CS network after one or more failed attempts at the VT call using one or more PS networks (e.g., a second configuration).

If the UE 115-*a* is configured to redial the VT call exclusively using PS networks (e.g., configured not to lose video capabilities), the UE 115-*a* may determine whether to reattempt the VT call via a PS network or end the VT call (e.g., since the UE 115-a may not be configured to fall back or switch to a CS network). The configuration to redial exclusively using PS networks (e.g., PS RATs, such as LTE or NR 5G) may allow for customized VT call silent redial behavior (e.g., allow the UE 115-a to have either the first configuration or the second configuration). In one example, the UE 115-a may reattempt the VT call using a second RAT via the base station 105-b. The base station 105-b may support communications using the second RAT and may be an example of a second PS network. In another example, the UE 115-a may reattempt the VT call using the first RAT via the base station 105-a. In yet another example, the UE 115-a may end the VT call. In yet another example, the UE 115-a may move to a different PLMN and reattempt the VT call via the different PLMN.

As mentioned above, the decision of whether to reattempt the VT call via the first RAT or the second RAT, end the VT call, or move to the different PLMN for the VT call may depend on a rejection cause in the rejection message 225 received from the base station 105-a, for example. In particular, the UE 115-a may make different decisions for performing a silent redial depending on whether the rejection cause indicates a network service rejection, access barring related failures, unified access control (UAC) failures, IMS permanent registration failures, IMS temporary registration failures, etc.

For network service reject causes (e.g., if the rejection cause indicates a network service reject cause), silent redial behavior may be categorized into three actions. For rarely seen causes or for hard failures (e.g., rejection cause #22 indicating that the network is congested), a modem at the UE 115-a may directly end the VT call (e.g., if the UE 115-a is configured to redial the VT call exclusively using PS networks). Rarely seen causes or hard failures may correspond to permanent rejections of the VT call by the base station 105-a on the first RAT, the base station 105-b on the second RAT, or both. Examples of rarely seen causes or hard failures may be a rejection cause in the rejection message 225 indicating an invalid universal subscriber identity module (USIM) on a PS domain, a networking issue, a network rejection, or that a network cannot serve the VT call. For soft failures, the modem at the UE 115-a may wait for a reattempt to happen. That is, the UE 115-a may reattempt the VT call using the first RAT via the first base station 105-a. Soft failures may correspond to temporary rejections of the VT call by the base station 105-a on the first RAT. If the VT call is unlikely to succeed over the base station 105-a (e.g., a current cell), the modem at the UE 115-a may perform a silent redial using the second RAT via the base station 105-b (e.g., if the UE 115-a has not already attempted the VT call over the second RAT). If the modem at the UE 115-a has already attempted the VT call over the second RAT, the modem at the UE 115-a may reattempt the VT call using the first RAT (e.g., stay on the current RAT to redial). In some cases, the UE 115-a may determine that the VT call is unlikely to succeed over the base station 105-a based on a rejection cause in the rejection message 225 indicating a permanent rejection of the VT call by the base station 105-a.

For access barring related failures (e.g., if the rejection cause indicates an access barring related failure), the modem at the UE 115-a may move away from a current PLMN to allow system selection to other PLMNs. For UAC failures (e.g., if the rejection cause indicates a UAC failure), the modem at the UE 115-a may end the call if a rejection cause in the rejection message 225 indicates failure due to congestion or a service area restriction. If the UAC failure is due to other reasons, the modem at the UE 115-a may move away from the current PLMN to allow system selection to other PLMNs. For IMS permanent registration failures (e.g., if the rejection cause indicates an IMS permanent registration failure), the modem at the UE 115-a may redial using the second RAT via the base station 105-b (e.g., over another PS RAT if not yet attempted) if registration takes longer than a threshold amount of time (e.g., too long) or if the UE 115-a camps on a cell that does not support voice over IMS. If the modem at the UE 115-a has already attempted the VT call over the second RAT (e.g., the other RAT), the modem at the UE 115-a may reattempt the VT call using the first RAT via the base station 105-a (e.g., stay on a current RAT to redial). For IMS temporary registration failures (e.g., if the rejection cause indicates an IMS temporary registration failure), the UE 115-a may retry the IMS registration until a configurable timer expires (e.g., IMS retry may be allowed until a configurable timer expires).

If the UE 115-a is configured to switch 230 to a CS network after one or more failed attempts at the VT call using one or more PS networks (e.g., configured to keep a call connected as video or voice), the UE 115-a may convert the VT call to a voice call or simply attempt a voice call instead of the VT call over the CS network. The UE 115-a may then apply one or more procedures available for performing CS-fallback for voice calls to the voice call (e.g., modem silent redial behavior shall follow the existing silent redial behavior for a voice call). Additionally, or alternatively, the UE 115-a may attempt the VT call via one or more PS networks before switching to the CS network for the VT call (e.g., CS plus PS RATs redial). For instance, the UE 115-a may reattempt the VT call using the first RAT via the base station 105-a or the second RAT via the base station 105-b or the UE 115-a may move to a different PLMN for the VT call before switching to the CS network for the VT call.

Figure 3:
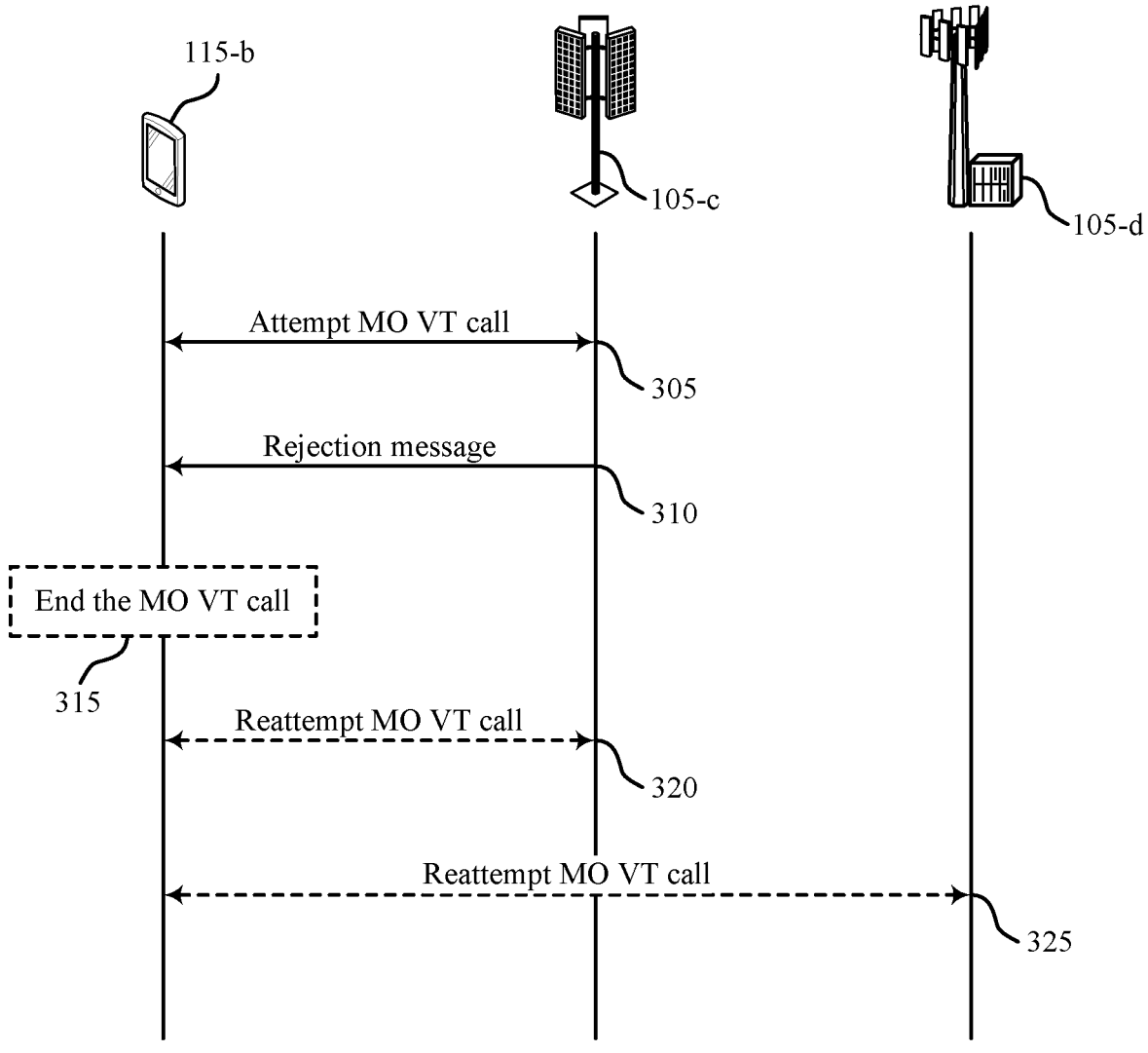
FIG. 3 illustrates an example of a process flow that supports silent redial for VT calls in accordance with aspects of the present disclosure.

FIG. 3 illustrates an example of a process flow 300 that supports silent redial for VT calls in accordance with aspects of the present disclosure. Process flow 300 includes a UE 115-b, which may be an example of a UE 115 described with reference to FIGS. 1 and 2. Process flow 300 also includes a base station 105-c and a base station 105-d, which may be examples of a base station 105 described with reference to FIGS. 1 and 2. The process flow 300 may implement aspects of wireless communications system 200. For example, the process flow 300 may support efficient techniques for facilitating silent redialing for VT calls.

In the following description of the process flow 300, the signaling between the UE 115-b, the base station 105-c, and the base station 105-d may be exchanged in a different order than the example order shown, or the operations performed by the UE 115-b, the base station 105-c, and the base station 105-d may be performed in different orders or at different times. Some operations may also be omitted from the process flow 300, and other operations may be added to the process flow 300.

In the example of FIG. 3, the UE 115-b may attempt an MO VT call using one or more PS networks. The UE 115-b may be configured to redial the MO VT call exclusively using PS networks. Such a configuration may be referred to as a first configuration. Alternatively, the UE 115-b may be configured to switch to a CS network after one or more failed attempts at the MO VT call using one or more PS networks. Such a configuration may be referred to as a second configuration. If the UE 115-b is configured to switch to the CS network, the UE 115-b may convert the MO VT call to a voice call or simply attempt a voice call instead of the MO VT call after one or more failed attempts at the MO VT call using the one or more PS networks. In some cases, the UE 115-*b* may receive an indication of the first configuration or the second configuration from a base station 105 (e.g., the base station 105-*a*). Additionally, or alternatively, the UE 115-*b* may select either the first configuration or the second configuration based on user input.

At 305, the UE 115-*b* may attempt the MO VT call using a first RAT over a first PS network via the base station 105-*c*. At 310, the UE 115-*b* may receive a rejection message from the base station 105-*c* indicating that the MO VT call failed. The UE 115-*b* may then determine whether to end the MO VT call, reattempt the MO VT call using the first RAT over the first PS network via the base station 105-*c*, or reattempt the MO VT call using a second RAT over a second PS network via the base station 105-*d* based on a rejection cause in the rejection message and whether the UE 115-*b* is configured to redial the MO VT call exclusively using PS networks or to switch to a CS network after one or more failed attempts at the MO VT call using one or more PS networks.

At 315, the UE 115-*b* may end the MO VT call. In some cases, the UE 115-*b* may end the MO VT call based on the rejection cause indicating a permanent rejection of the MO VT call using the first RAT. The permanent rejection may correspond to a hard failure of the MO VT call via the first RAT. In some cases, the UE 115-*b* may also end the MO VT call based on receiving another permanent rejection of the MO VT call using a second RAT. The UE 115-*b* may receive the other permanent rejection in a rejection message from the base station 105-*d* using the second RAT. The rejection cause in the rejection message received from the base station 105-*a* or the base station 105-*b* may indicate a network service rejection or a UAC failure. Additionally, or alternatively, the rejection cause in the rejection message received from the base station 105-*a* or the base station 105-*b* may indicate that the MO VT call failed due to network congestion, a service area restriction, or an invalid USIM.

At 320, the UE 115-*b* may reattempt the MO VT call using the first RAT over the first PS network via the base station 105-*c*. The decision to reattempt the MO VT call using the first RAT may be based on detecting that the UE 115-*b* previously attempted the MO VT call using the second RAT via the base station 105-*d*. In some cases, the UE 115-*b* may reattempt the MO VT call using the first RAT based on the rejection cause indicating a temporary rejection of the MO VT call using the first RAT. The temporary rejection may correspond to a soft failure of the MO VT call via the first RAT. The rejection cause in the rejection message received from the base station 105-*a* may indicate a network service rejection, an IMS permanent registration failure, or an IMS temporary registration failure. Further, the UE 115-*b* may reattempt the MO VT call until a configurable timer expires.

At 325, the UE 115-*b* may reattempt the MO VT call using a second RAT over a second PS network via the base station 105-*d*. The decision to reattempt the MO VT call using the second RAT may be based on detecting that the UE 115-*b* has not yet attempted the MO VT call using the second RAT via the base station 105-*d*. In some cases, the UE 115-*b* may reattempt the MO VT call using the second RAT based on the rejection cause indicating a permanent rejection of the MO VT call using the first RAT. The permanent rejection may correspond to a hard failure of the MO VT call via the first RAT. The rejection cause in the rejection message received from the base station 105-*a* may indicate a network service rejection or an IMS permanent registration failure.

Further, the rejection message may be due to a time to complete registration exceeding a threshold amount of time or the UE 115-*b* camping on a cell that lacks support for voice over IMS.

In some aspects, rather than reattempting the MO VT call over a PLMN associated with the base station 105-*c*, the UE 115-*b* may move to a different PLMN. For instance, the UE 115-*b* may identify a second PLMN through which to reattempt the MO VT call based on failing to perform the MO VT call through a first PLMN. In such aspects, the rejection cause may indicate an access barring related failure or a UAC failure. The UE 115-*b* may reattempt or redial the MO VT call via a base station 105 (e.g., base station 105-*b*) in the second PLMN. In one example, the base station 105-*c* may be linked to the first PLMN, and the base station 105-*d* may be linked to the second PLMN.

Figure 4:
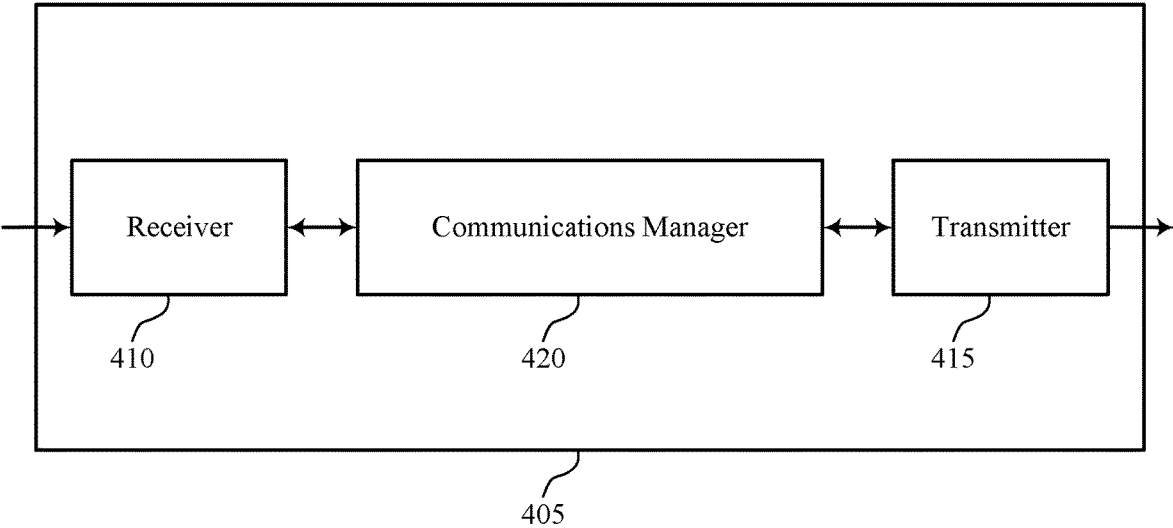
FIGS. 4 and 5 show block diagrams of devices that support silent redial for VT calls in accordance with aspects of the present disclosure.

FIG. 4 shows a block diagram 400 of a device 405 that supports silent redial for VT calls in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to silent redial for VT calls). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to silent redial for VT calls). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of silent redial for VT calls as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for attempting a mobile originated video telephony call using a first radio access technology over a first packet-switched network. The communications manager 420 may be configured as or otherwise support a means for receiving a rejection message indicating that the mobile originated video telephony call failed. The communications manager 420 may be configured as or otherwise support a means for reattempting the mobile originated video telephony call based on a rejection cause included in the rejection message and whether the UE is configured to redial the mobile originated video telephony call exclusively using packet-switched networks, or to switch to a circuit-switched network after one or more failed attempts at the mobile originated video telephony call using one or more of the packet-switched networks.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improved user experience and more efficient utilization of communication resources. In particular, a UE may efficiently perform silent redialing for VT calls resulting in an increased success rate for VT calls. Because the success rate for VT calls may be increased, user experience may be improved, and a UE may avoid wasting resources on reattempting VT calls without silent redialing (e.g., based on user input).

Figure 5:
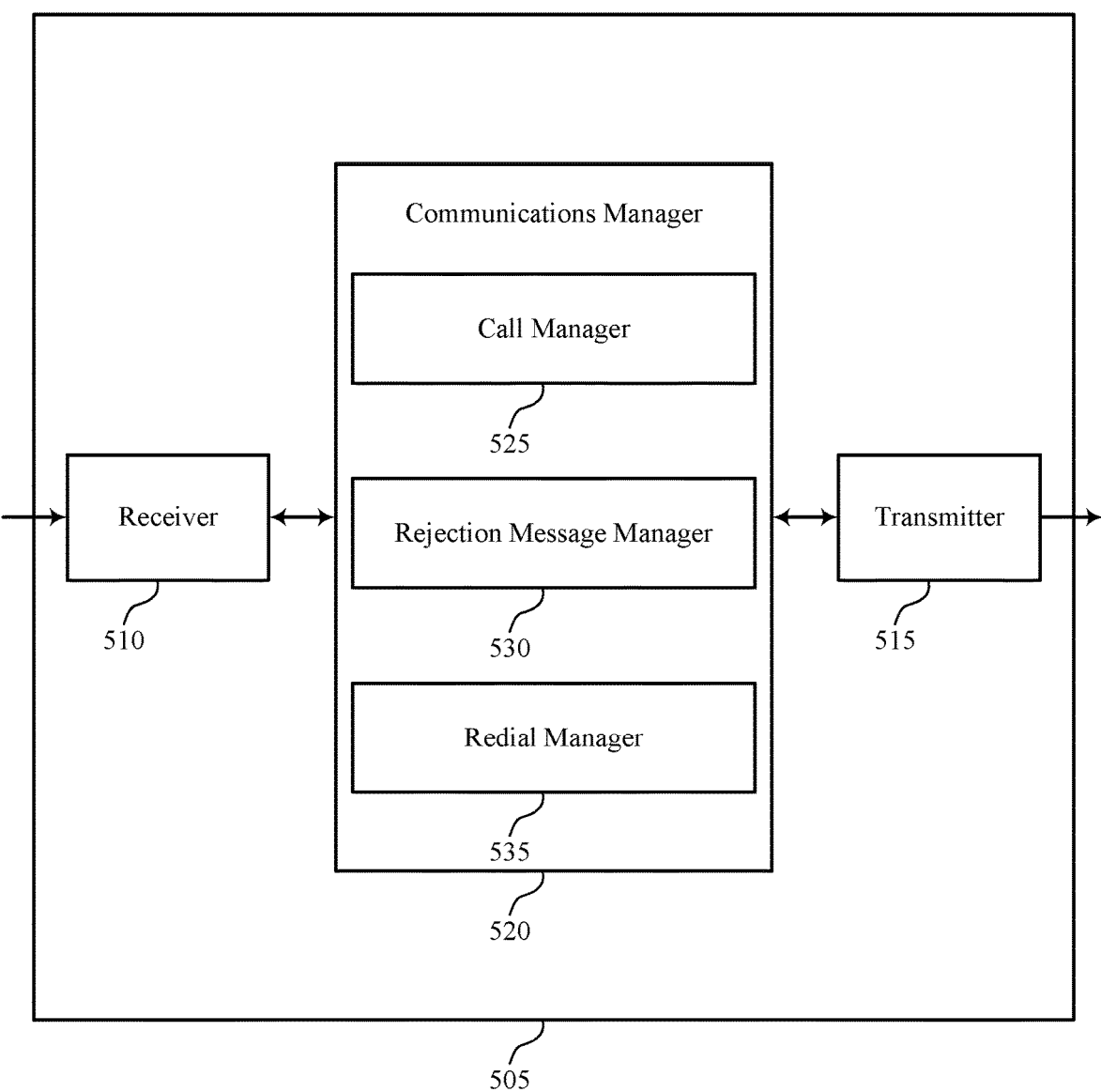

FIG. 5 shows a block diagram 500 of a device 505 that supports silent redial for VT calls in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to silent redial for VT calls). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to silent redial for VT calls). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of silent redial for VT calls as described herein. For example, the communications manager 520 may include a call manager 525, a rejection message manager 530, a redial manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The call manager 525 may be configured as or otherwise support a means for attempting a mobile originated video telephony call using a first radio access technology over a first packet-switched network. The rejection message manager 530 may be configured as or otherwise support a means for receiving a rejection message indicating that the mobile originated video telephony call failed. The redial manager 535 may be configured as or otherwise support a means for reattempting the mobile originated video telephony call based on a rejection cause included in the rejection message and whether the UE is configured to redial the mobile originated video telephony call exclusively using packet-switched networks, or to switch to a circuit-switched network after one or more failed attempts at the mobile originated video telephony call using one or more of the packet-switched networks.

Figure 6:
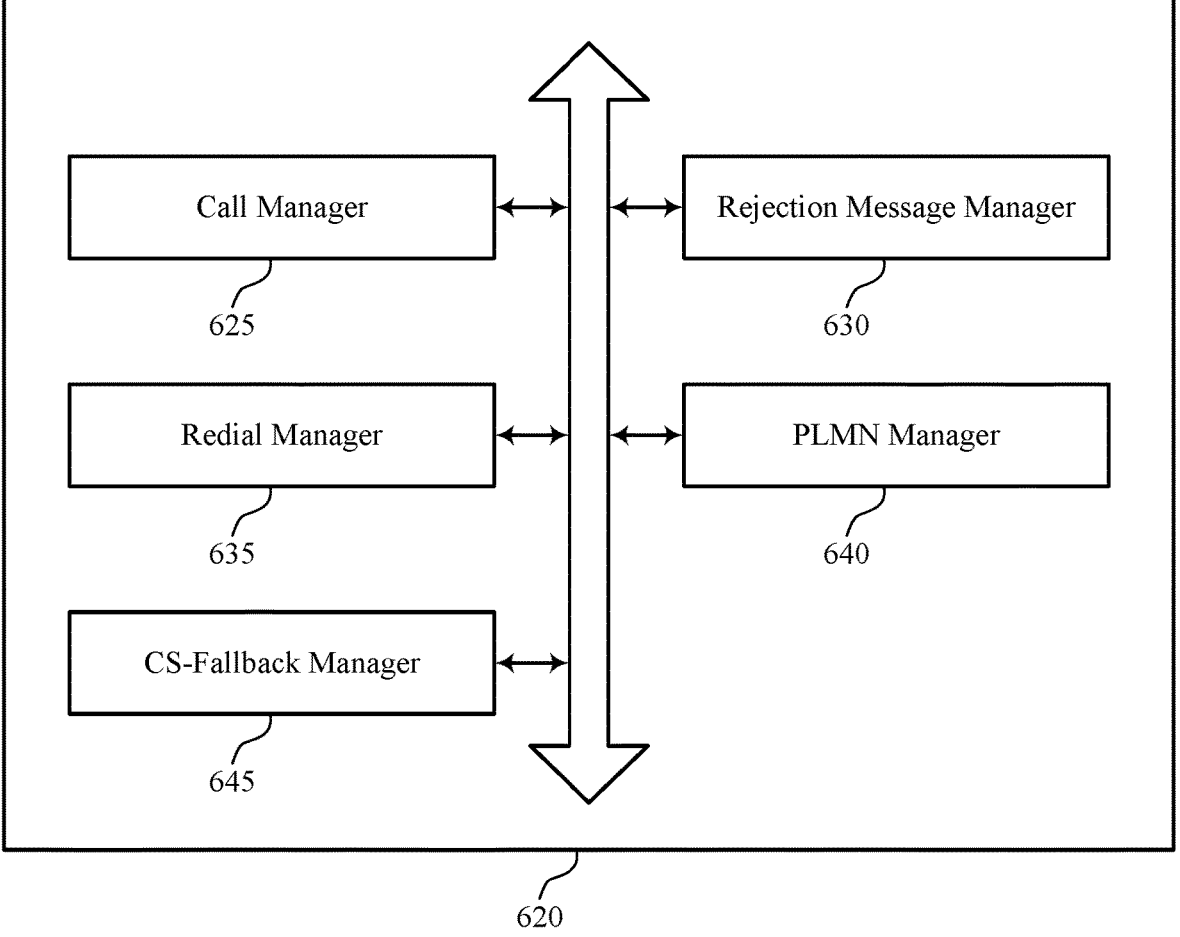
FIG. 6 shows a block diagram of a communications manager that supports silent redial for VT calls in accordance with aspects of the present disclosure.

FIG. 6 shows a block diagram 600 of a communications manager 620 that supports silent redial for VT calls in accordance with aspects of the present disclosure. The communications manager 620 may be an example of aspects of a communications manager 420, a communications manager 520, or both, as described herein. The communications manager 620, or various components thereof, may be an example of means for performing various aspects of silent redial for VT calls as described herein. For example, the communications manager 620 may include a call manager 625, a rejection message manager 630, a redial manager 635, an PLMN manager 640, a CS-fallback manager 645, or any combination thereof. Each of these components may communicate, directly or indirectly, with one another (e.g., via one or more buses).

The communications manager 620 may support wireless communication at a UE in accordance with examples as disclosed herein. The call manager 625 may be configured as or otherwise support a means for attempting a mobile originated video telephony call using a first radio access technology over a first packet-switched network. The rejection message manager 630 may be configured as or otherwise support a means for receiving a rejection message indicating that the mobile originated video telephony call failed. The redial manager 635 may be configured as or otherwise support a means for reattempting the mobile originated video telephony call based on a rejection cause included in the rejection message and whether the UE is configured to redial the mobile originated video telephony call exclusively using packet-switched networks, or to switch to a circuit-switched network after one or more failed attempts at the mobile originated video telephony call using one or more of the packet-switched networks.

In some examples, to support reattempting the mobile originated video telephony call, the redial manager 635 may be configured as or otherwise support a means for reattempting the mobile originated video telephony call using a second radio access technology over a second packet-switched network. In some examples, reattempting the mobile originated video telephony call is based on the rejection cause indicating a permanent rejection of the mobile originated video telephony call using the first radio access technology. In some examples, the permanent rejection corresponds to a hard failure of the mobile originated video telephony call via the first radio access technology. In some examples, the rejection message indicates a network service rejection or an internet protocol multimedia subsystem permanent registration failure. In some examples, the rejection message is due to a time to complete registration exceeding a threshold amount of time or the UE camping on a cell that lacks support for voice over internet protocol multimedia subsystem.

In some examples, to support reattempting the mobile originated video telephony call, the redial manager 635 may be configured as or otherwise support a means for reattempting the mobile originated video telephony call using the first radio access technology over the first packet-switched network based on detecting that the UE previously attempted the mobile originated video telephony call using a second radio access technology. In some examples, reattempting the mobile originated video telephony call is based on the rejection cause indicating a temporary rejection of the mobile originated video telephony call using the first radio access technology. In some examples, the temporary rejection corresponds to a soft failure of the mobile originated video telephony call via the first radio access technology. In some examples, the rejection cause indicates a network service rejection, an internet protocol multimedia subsystem permanent registration failure, or an internet protocol multimedia subsystem temporary registration failure. In some examples, reattempting the mobile originated video telephony call includes reattempting the mobile originated video telephony call until a configurable timer expires.

In some examples, the call manager 625 may be configured as or otherwise support a means for ending the mobile originated video telephony call. In some examples, ending the mobile originated video telephony call is based on the rejection cause indicating a permanent rejection of the mobile originated video telephony call using the first radio access technology. In some examples, the permanent rejection corresponds to a hard failure of the mobile originated video telephony call via the first radio access technology. In some examples, ending the mobile originated video is further based on receiving another permanent rejection of the mobile originated video telephony call using a second radio access technology. In some examples, the rejection cause indicates a network service rejection or a unified access control failure. In some examples, the rejection cause indicates that the mobile originated video telephony call failed due to network congestion, a service area restriction, or an invalid universal subscriber identity module.

In some examples, the PLMN manager 640 may be configured as or otherwise support a means for identifying a second public land mobile network through which to reattempt the mobile originated video telephony call based on failing to perform the mobile originated video telephony call through a first public land mobile network. In some examples, the rejection cause indicates an access barring related failure or a unified access control failure. In some examples, the UE is configured to redial the mobile originated video telephony call exclusively using packet-switched networks. In some examples, the CS-fallback manager 645 may be configured as or otherwise support a means for converting the mobile originated video telephony call to a voice call over the circuit-switched network after one or more failed attempts at the mobile originated video telephony call using one or more of the packet-switched networks.

Figure 7:
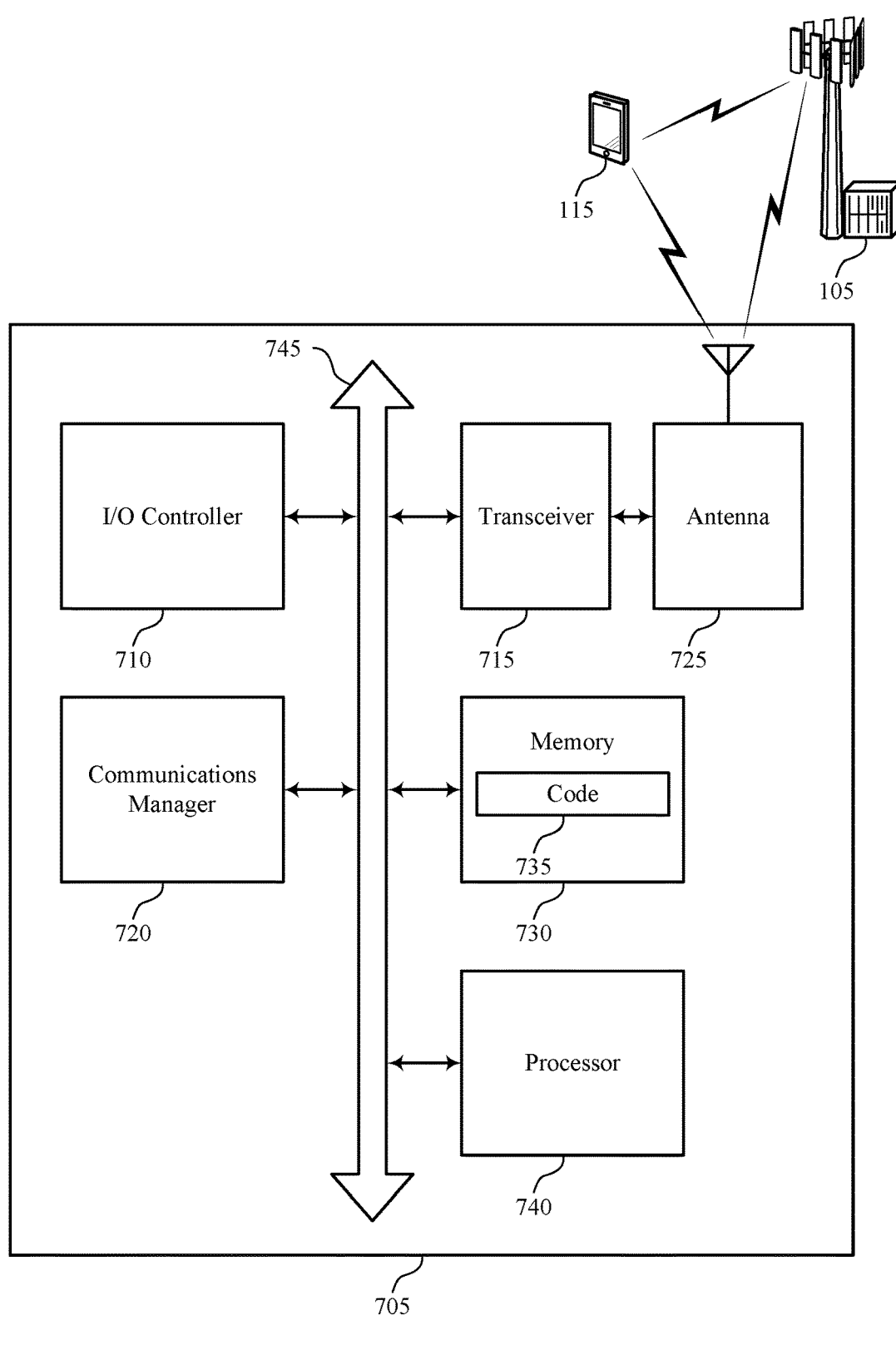
FIG. 7 shows a diagram of a system including a device that supports silent redial for VT calls in accordance with aspects of the present disclosure.

FIG. 7 shows a diagram of a system 700 including a device 705 that supports silent redial for VT calls in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting silent redial for VT calls). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for attempting a mobile originated video telephony call using a first radio access technology over a first packet-switched network. The communications manager 720 may be configured as or otherwise support a means for receiving a rejection message indicating that the mobile originated video telephony call failed. The communications manager 720 may be configured as or otherwise support a means for reattempting the mobile originated video telephony call based on a rejection cause included in the rejection message and whether the UE is configured to redial the mobile originated video telephony call exclusively using packet-switched networks, or to switch to a circuit-switched network after one or more failed attempts at the mobile originated video telephony call using one or more of the packet-switched networks.

By including or configuring the communications manager 720 in accordance with examples as described herein, the device 705 may support techniques for improved user experience and more efficient utilization of communication resources. In particular, a UE may efficiently perform silent redialing for VT calls resulting in an increased success rate for VT calls. Because the success rate for VT calls may be increased, user experience may be improved, and a UE may avoid wasting resources on reattempting VT calls without silent redialing (e.g., based on user input).

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of silent redial for VT calls as described herein, or the processor 740 and the memory 730 may be otherwise configured to perform or support such operations.

FIG. 8 shows a flowchart illustrating a method 800 that supports silent redial for VT calls in accordance with aspects of the present disclosure. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 805, the method may include attempting a mobile originated video telephony call using a first radio access technology over a first packet-switched network. The operations of 805 may be performed in accordance with examples as disclosed herein. In some examples, aspects of the operations of 805 may be performed by a call manager 625 as described with reference to FIG. 6.

At 810, the method may include receiving a rejection message indicating that the mobile originated video telephony call failed. The operations of 810 may be performed in accordance with examples as disclosed herein. In some examples, aspects of the operations of 810 may be performed by a rejection message manager 630 as described with reference to FIG. 6.

At 815, the method may include reattempting the mobile originated video telephony call based on a rejection cause included in the rejection message and whether the UE is configured to redial the mobile originated video telephony call exclusively using packet-switched networks, or to switch to a circuit-switched network after one or more failed attempts at the mobile originated video telephony call using one or more of the packet-switched networks. The operations of 815 may be performed in accordance with examples as disclosed herein. In some examples, aspects of the operations of 815 may be performed by a redial manager 635 as described with reference to FIG. 6.

The Following Provides an Overview of Aspects of the Present Disclosure:

Aspect 1: A method for wireless communication at a UE, comprising: attempting a mobile originated video telephony call using a first radio access technology over a first packet-switched network; receiving a rejection message indicating that the mobile originated video telephony call failed; and reattempting the mobile originated video telephony call based at least in part on a rejection cause included in the rejection message and whether the UE is configured to redial the mobile originated video telephony call exclusively using packet-switched networks, or to switch to a circuit-switched network after one or more failed attempts at the mobile originated video telephony call using one or more of the packet-switched networks.

Aspect 2: The method of aspect 1, wherein reattempting the mobile originated video telephony call comprises: reattempting the mobile originated video telephony call using a second radio access technology over a second packet-switched network.

Aspect 3: The method of aspect 2, wherein reattempting the mobile originated video telephony call is based at least in part on the rejection cause indicating a permanent rejection of the mobile originated video telephony call using the first radio access technology.

Aspect 4: The method of aspect 3, wherein the permanent rejection corresponds to a hard failure of the mobile originated video telephony call via the first radio access technology.

Aspect 5: The method of any of aspects 2 through 4, wherein the rejection message indicates a network service rejection or an internet protocol multimedia subsystem permanent registration failure.

Aspect 6: The method of any of aspects 2 through 5, wherein the rejection message is due to a time to complete registration exceeding a threshold amount of time or the UE camping on a cell that lacks support for voice over internet protocol multimedia subsystem.

Aspect 7: The method of any of aspects 1 through 6, wherein reattempting the mobile originated video telephony call comprises: reattempting the mobile originated video telephony call using the first radio access technology over the first packet-switched network based at least in part on detecting that the UE previously attempted the mobile originated video telephony call using a second radio access technology.

Aspect 8: The method of aspect 7, wherein reattempting the mobile originated video telephony call is based at least in part on the rejection cause indicating a temporary rejection of the mobile originated video telephony call using the first radio access technology.

Aspect 9: The method of aspect 8, wherein the temporary rejection corresponds to a soft failure of the mobile originated video telephony call via the first radio access technology.

Aspect 10: The method of any of aspects 7 through 9, wherein the rejection cause indicates a network service rejection, an internet protocol multimedia subsystem permanent registration failure, or an internet protocol multimedia subsystem temporary registration failure.

Aspect 11: The method of any of aspects 7 through 10, wherein reattempting the mobile originated video telephony call comprises reattempting the mobile originated video telephony call until a configurable timer expires.

Aspect 12: The method of any of aspects 1 through 11, further comprising: ending the mobile originated video telephony call.

Aspect 13: The method of aspect 12, wherein ending the mobile originated video telephony call is based at least in part on the rejection cause indicating a permanent rejection of the mobile originated video telephony call using the first radio access technology.

Aspect 14: The method of aspect 13, wherein the permanent rejection corresponds to a hard failure of the mobile originated video telephony call via the first radio access technology.

Aspect 15: The method of any of aspects 13 through 14, wherein ending the mobile originated video is further based at least in part on receiving another permanent rejection of the mobile originated video telephony call using a second radio access technology.

Aspect 16: The method of any of aspects 12 through 15, wherein the rejection cause indicates a network service rejection or a unified access control failure.

Aspect 17: The method of any of aspects 12 through 16, wherein the rejection cause indicates that the mobile originated video telephony call failed due to network congestion, a service area restriction, or an invalid universal subscriber identity module.

Aspect 18: The method of any of aspects 1 through 17, further comprising: identifying a second public land mobile network through which to reattempt the mobile originated video telephony call based at least in part on failing to perform the mobile originated video telephony call through a first public land mobile network.

Aspect 19: The method of aspect 18, wherein the rejection cause indicates an access barring related failure or a unified access control failure.

Aspect 20: The method of any of aspects 1 through 19, wherein the UE is configured to redial the mobile originated video telephony call exclusively using packet-switched networks.

Aspect 21: The method of any of aspects 1 through 20, further comprising: converting the mobile originated video telephony call to a voice call over the circuit-switched network after one or more failed attempts at the mobile originated video telephony call using one or more of the packet-switched networks.

Aspect 22: An apparatus for wireless communication at a UE, comprising a processor; memory coupled with the processor; and instructions stored in the memory and executable by the processor to cause the apparatus to perform a method of any of aspects 1 through 21.

Aspect 23: An apparatus for wireless communication at a UE, comprising at least one means for performing a method of any of aspects 1 through 21.

Aspect 24: A non-transitory computer-readable medium storing code for wireless communication at a UE, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

attempting a mobile originated video telephony call using a first radio access technology over a first packet-switched network;

receiving a rejection message indicating that the mobile originated video telephony call failed; and reattempting the mobile originated video telephony call based at least in part on a rejection cause included in the rejection message and whether the UE is configured to redial the mobile originated video telephony call exclusively using packet-switched networks, or to switch to a circuit-switched network and convert the mobile originated video telephony call to a voice call after one or more failed attempts at the mobile originated video telephony call using one or more of the packet-switched networks.

2. The method of claim 1, wherein reattempting the mobile originated video telephony call comprises:

reattempting the mobile originated video telephony call using a second radio access technology over a second packet-switched network.

3. The method of claim 2, wherein reattempting the mobile originated video telephony call is based at least in part on the rejection cause indicating a permanent rejection of the mobile originated video telephony call using the first radio access technology.

4. The method of claim 3, wherein the permanent rejection corresponds to a hard failure of the mobile originated video telephony call via the first radio access technology.

5. The method of claim 2, wherein the rejection message indicates a network service rejection or an internet protocol multimedia subsystem permanent registration failure.

6. The method of claim 2, wherein the rejection message is due to a time to complete registration exceeding a threshold amount of time or the UE camping on a cell that lacks support for voice over internet protocol multimedia subsystem.

7. The method of claim 1, wherein reattempting the mobile originated video telephony call comprises:

reattempting the mobile originated video telephony call using the first radio access technology over the first packet-switched network based at least in part on detecting that the UE previously attempted the mobile originated video telephony call using a second radio access technology.

8. The method of claim 7, wherein reattempting the mobile originated video telephony call is based at least in part on the rejection cause indicating a temporary rejection of the mobile originated video telephony call using the first radio access technology.

9. The method of claim 8, wherein the temporary rejection corresponds to a soft failure of the mobile originated video telephony call via the first radio access technology.

10. The method of claim 7, wherein the rejection cause indicates a network service rejection, an internet protocol multimedia subsystem permanent registration failure, or an internet protocol multimedia subsystem temporary registration failure.

11. The method of claim 7, wherein reattempting the mobile originated video telephony call comprises reattempting the mobile originated video telephony call until a configurable timer expires.

12. The method of claim 1, further comprising:

ending the mobile originated video telephony call.

13. The method of claim 12, wherein ending the mobile originated video telephony call is based at least in part on the rejection cause indicating a permanent rejection of the mobile originated video telephony call using the first radio access technology.

14. The method of claim 13, wherein the permanent rejection corresponds to a hard failure of the mobile originated video telephony call via the first radio access technology.

15. The method of claim 13, wherein ending the mobile originated video telephony call is further based at least in part on receiving another permanent rejection of the mobile originated video telephony call using a second radio access technology.

16. The method of claim 12, wherein the rejection cause indicates a network service rejection or a unified access control failure.

17. The method of claim 12, wherein the rejection cause indicates that the mobile originated video telephony call failed due to network congestion, a service area restriction, or an invalid universal subscriber identity module.

18. The method of claim 1, further comprising:

identifying a second public land mobile network through which to reattempt the mobile originated video telephony call based at least in part on failing to perform the mobile originated video telephony call through a first public land mobile network.

19. The method of claim 18, wherein the rejection cause indicates an access barring related failure or a unified access control failure.

20. The method of claim 1, wherein the UE is configured to redial the mobile originated video telephony call exclusively using packet-switched networks.

21. The method of claim 1, further comprising:

converting the mobile originated video telephony call to the voice call over the circuit-switched network after one or more failed attempts at the mobile originated video telephony call using one or more of the packet-switched networks.

22. A user equipment (UE) for wireless communication, comprising:

at least one processor;

at least one memory coupled with the at least one processor; and instructions stored in the at least one memory and executable by the at least one processor to cause the UE to:

attempt a mobile originated video telephony call using a first radio access technology over a first packet-switched network;

receive a rejection message indicating that the mobile originated video telephony call failed; and reattempt the mobile originated video telephony call based at least in part on a rejection cause included in the rejection message and whether the UE is configured to redial the mobile originated video telephony call exclusively using packet-switched networks, or to switch to a circuit-switched network and convert the mobile originated video telephony call to a voice call after one or more failed attempts at the mobile originated video telephony call using one or more of the packet-switched networks.

23. The UE of claim 22, wherein the instructions to reattempt the mobile originated video telephony call are executable by the at least one processor to cause the UE to:

reattempt the mobile originated video telephony call using a second radio access technology over a second packet-switched network.

24. The UE of claim 23, wherein reattempting the mobile originated video telephony call is based at least in part on the rejection cause indicating a permanent rejection of the mobile originated video telephony call using the first radio access technology.

25. The UE of claim 22, wherein the instructions to reattempt the mobile originated video telephony call are executable by the at least one processor to cause the UE to:

reattempt the mobile originated video telephony call using the first radio access technology over the first packet-switched network based at least in part on detecting that the UE previously attempted the mobile originated video telephony call using a second radio access technology.

26. The UE of claim 25, wherein reattempting the mobile originated video telephony call is based at least in part on the rejection cause indicating a temporary rejection of the mobile originated video telephony call using the first radio access technology.

27. The UE of claim 22, wherein the instructions are further executable by the at least one processor to cause the UE to:

end the mobile originated video telephony call.

28. The UE of claim 22, wherein the instructions are further executable by the at least one processor to cause the UE to:

identify a second public land mobile network through which to reattempt the mobile originated video telephony call based at least in part on failing to perform the mobile originated video telephony call through a first public land mobile network.

29. The UE of claim 22, wherein the UE is configured to redial the mobile originated video telephony call exclusively using packet-switched networks.

30. The UE of claim 22, wherein the instructions are further executable by the at least one processor to cause the UE to:

convert the mobile originated video telephony call to the voice call over the circuit-switched network after one or more failed attempts at the mobile originated video telephony call using one or more of the packet-switched networks.

* * * * *